United States Patent
Rolfes

(10) Patent No.: US 6,305,267 B1
(45) Date of Patent: Oct. 23, 2001

(54) AUTOMATED FILL BEFORE BREWING COFFEE BREWER

(76) Inventor: Patrick J. Rolfes, 2006 Seadrift Dr., Corona Del Mar, CA (US) 92625

(*) Notice: Subject to any disclaimer, the term of this patent is extended or adjusted under 35 U.S.C. 154(b) by 0 days.

(21) Appl. No.: 09/609,456

(22) Filed: Jul. 3, 2000

(51) Int. Cl.[7] .................................................. A47J 31/00
(52) U.S. Cl. .................................................. 99/281; 99/305
(58) Field of Search .............................. 99/281, 282, 280, 99/305; 392/490, 485; 137/341; 222/64

(56) References Cited

U.S. PATENT DOCUMENTS

| | | | |
|---|---|---|---|
| 2,641,992 | * 6/1953 | Clemens | 99/305 X |
| 3,446,937 | * 5/1969 | Hugentobler | 99/281 |
| 3,459,118 | * 8/1969 | Hausam | 99/305 X |
| 3,593,649 | * 7/1971 | Novi | 99/280 X |
| 4,825,758 | * 5/1989 | Snowball et al. | 99/282 |
| 5,063,836 | 11/1991 | Patel | 99/281 |
| 5,404,794 | 4/1995 | Patel et al. | 99/280 |
| 5,836,236 | 11/1998 | Rolfes et al. | 99/290 |
| 5,875,703 | 3/1999 | Rolfes | 99/283 |

* cited by examiner

*Primary Examiner*—Reginald L. Alexander
(74) *Attorney, Agent, or Firm*—Gordon K. Anderson

(57) ABSTRACT

A fill before brewing system for an automated coffee brewer is disclosed which includes solid state electronic controls, a water reservoir and a full pot brew switch (20) integral with the coffee brewer. A fill solenoid (22) is electrically interconnected with the full pot brew switch such that when this switch is energized the fill solenoid begins to fill the brewer reservoir with water. A full pot fill level control (24) is electrically connected with the full pot brew switch that operates when water in the reservoir reaches a predetermined level the fill solenoid terminates the water flow. A boiler (26) interacts with the full pot brew switch in that when the full pot brew switch is energized the boiler is activated simultaneously with the fill solenoid boiling water for brewing coffee. A reservoir empty level control (28) is connected with the boiler and disconnects the boiler when the level of water in the reservoir reaches the desired point. A half pot system functions in the same manner above except it only makes a half of the quantity of coffee.

6 Claims, 2 Drawing Sheets

AUTOMATED FILL BEFORE BREWING COFFEE BREWER

TECHNICAL FIELD

The present invention relates to coffee brewers in general. More specifically to an automated coffee brewer that fills a reservoir upon demand at the beginning of a brew cycle.

BACKGROUND ART

Previously, many types of automatic coffee brewers have been developed for use in brewing coffee for commercial establishments. It is customary in many automated machines to maintain a reservoir full of water prior to staring the brewing process to eliminate the time it takes to fill the reservoir. Furthermore, in almost all cases prior art maintains the stored water at an elevated temperature to hasten the entire brewing procedure.

A search of the prior art did not disclose any patents that read directly on the claims of the instant invention, however the following U.S. patents are considered related:

| U.S. Pat. No. | Inventor | Issue Date |
|---|---|---|
| 5,875,703 | Rolfes | Mar. 2. 1999 |
| 5,836,236 | Rolfes et al | Nov. 17, 1998 |
| 5,404,794 | Patel et al | Apr. 11, 1995 |
| 5,063,836 | Patel | Nov. 12, 1991 |

Rolfes own U.S. Pat. No. 5,875,703 teaches an improvement on a coffee brewer and hot water dispenser which permits larger capacity by the use of a bypass hot water cycle adding a predetermined volume of water to the container and supplementing the control by expanding its capabilities using multiple sequencing of the brew cycle for increasing the volume of brewed coffee. Replacement water is introduced into the brewer from an outside city service source when the brew cycle draws all of the water from the reservoir making it available for the next cycle. This water is stored at the predetermined temperature as described in U.S. Pat. No. 5,836,236, upon which this improvement is based.

U.S. Pat. No. 5,836,236 issued to Rolfes et al., in which the first named inventor is the present inventor, discloses a coffee brewer and hot water dispenser which brews both coffee and also dispenses hot water from a separate system. The invention fills the tank upon completion of a brew cycle and employs a pre-heater that is attached to the brew tank through interconnecting tubing. The pre-heater is electrically cycled on and off and maintains the water temperature within the brew water tank at 150 degrees F. (65.6 degrees C.). The electronic controller maintains this temperature within a 10 degree (F.) range. A second hot water tank fills in the same manner and likewise contains a heater identical to the pre-heater except it maintains the water temperature at 185 degrees F. (85 degrees C.). This hot water tank is used for dispensing preheated water for tea or other similar beverages.

U.S. Pat. No. 5,404,794 of Patel et al. discloses a coffee making machine having a reservoir connected to an external water supply via a valve which divides the water into separate hot and cold water tanks. Heated water from a boiler is fed into an expansion chamber and then discharged into the ground coffee through a spray head at the end of an expansion chamber. A heating element is in the hot water tank and is energized by the controller to maintain the water therein at a preselected temperature. If the heating element is on and the brew cycle is initiated, the controller disables the heating element until the brew cycle is completed.

Patel in U.S. Pat. No. 5,063,836 teaches a coffee making machine of the type adapted to be connected to city water supply. The device includes a reservoir having a level sensor controlling a water refill valve to the reservoir and a heating element which heats the water therein. A level sensor functions to permit automatic refill of the reservoir at the appropriate level for subsequent brewing of a full pot of coffee irrespective of the water pressure and the previous route of the water. A solid state circuit board controls the operational sequence and the functions of the machine. The electronically controlled thermostat allow only small decreases in temperature, i.e. 3 degrees F. before operation to reheat the water in the reservoir. The water may accordingly be stored at a temperature closer to the boiling point and delivered to contact coffee grounds for brewing purposes at temperatures of not less than 200 degrees F.

DISCLOSURE OF THE INVENTION

The problem that has arisen in the prior art field of automated coffee brewing is that if the conventional brewing apparatus were to be employed in applications where there is movement evolved, such as over the road or on water. This type of brewing equipment is not practical since the reservoirs are obviously vented and are subject to sloshing, splashing leading to overflowing in the event of shock, vibration or rolling movements. This problem limits the use of the presently designed equipment without some type of modification specifically protecting this feature. It is therefore a primary object of the invention to circumvent this problem with the least amount of change and arrive at a simple solution. By eliminating the pre-heater and not having a heated reservoir the brewing is accomplished by filling the reservoir upon demand rather than having the hot water continually available. Although the time to brew is extended it is not as important, because if the brewer were to be used on mobile applications, or on smaller boats, the demand would not be as great as if it were used in the usual commercial environment.

Another object of the invention is that the previously designed equipment may now be used in an expanded marketplace with little basic development required and utilization of existing tooling may be realized. While this may not seem to be particularly important to large investors, it is of prime significance to smaller companies where expansion into other fields may be accomplished with a minimum amount of effort.

Still another object of the invention is the savings of electrical power as the energy required to maintain a reservoir full of water at an elevated temperature is completely eliminated. In recreational vehicles this type of design is ideal as city power is only available when the vehicle is parked and connected to utilities. Further when this electric power source is not available auxiliary power and direct current power is normally limited in its overall capacity. Other portable vehicles and mobile homes and the like have similar problems which the invention easily overcomes.

Yet another object of the invention is that the system is self priming in that after the initial filling the reservoir is never completely empty as a small amount of water is still present at the bottom which feeds water to the boiler making it instantly available when the user energizes the brew switch and starts the filling procedure. It is also noted that this small amount of water is subjected to the prevailing ambient temperatures which are usually higher than the water temperature coming from the city water supply ultimately decreasing the overall brew time.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
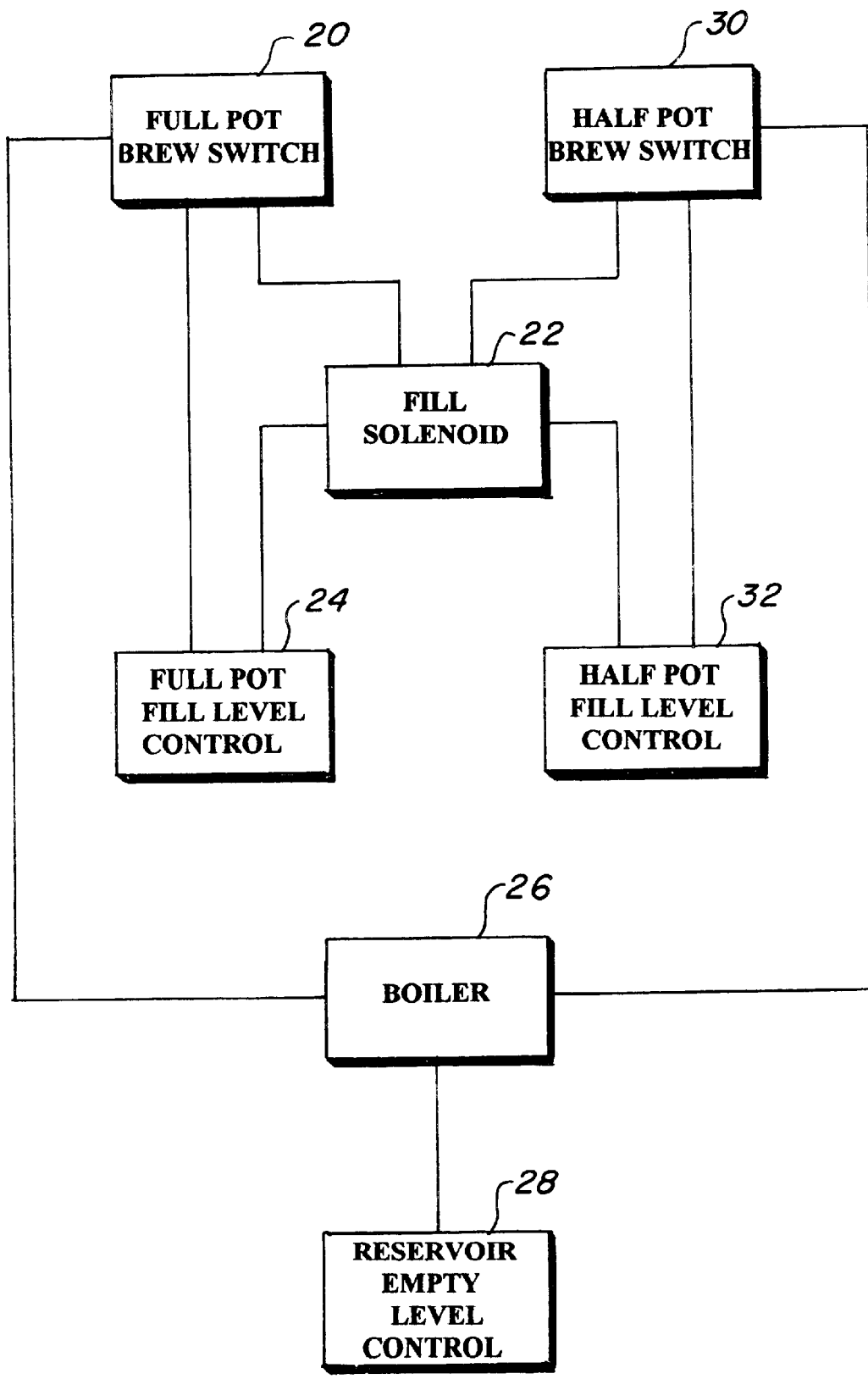
FIG. 1 is a block diagram of the preferred embodiment

The best mode for carrying out the invention is presented in terms of a preferred embodiment and a practical embodiment which simplifies the use of the improvement in an existing system. It must be remembered that the invention is only a small group of circuits within the broad spectrum of controls in an existing coffee brewer that is in practical use in today's marketplace. The preferred embodiment of the invention is shown in FIG. 1 in a block diagram and is comprised of a full pot brew switch 20 that is basically an integral part of the aforementioned commercial coffee brewer normally consisting of a touch pad switch, or a push button switch mounted on the coffee brewer control panel. Obviously other switches, indicating lights and controls are energized prior to the utilization of the full pot brew switch 20 however this component is the basic starting point in operation of the invention.

A fill solenoid 22 is hydraulically connected to an external water source and is also electrically interconnected with the full pot brew switch 20 such that when the full pot brew switch 20 is energized the fill solenoid 22 begins to fill a brewer reservoir with water. This fill solenoid 22 is defined as an electromagnetic solenoid valve which is well known in the art and consists of a valve body with a plunger that has an integral plug that interfaces with a seat in the body. The plunger is slideably interfaced with a solenoid coil of wrapped copper wire that surrounds the plunger and upon electrical energization an electromagnet field is created causing linear movement of the plunger opening the valve by pulling the plug away from the seat and a spring returns the plunger to the seat after power is interrupted.

A full pot fill level control 24 is electrically interconnected with the full pot brew switch 20 such that when water in the reservoir reaches a predetermined level, the fill solenoid 22 is de-energized terminating water flow. In a preferred automated coffee brewer, in which the invention may be utilized, the full pot fill level control 24 is a metallic rod through which an electrical current is passed to a ground probe using water within the reservoir as a conductor to complete an electrical circuit thus indicating that the predetermined water level water level has been achieved disconnecting the fill solenoid 22.

A boiler 26 is electrically interconnected with the full pot brew switch 20 such that when the full pot brew switch 20 is energized the boiler 26 is activated simultaneously with the fill solenoid 22 thereby boiling water for brewing coffee. The boiler 26 is an electrical resistance element housed in a watertight cylinder that boils the water and forces the boiling water and accompanying steam into a spray head which evenly distributes the liquid and vapor over coffee grounds retained in a filter. The boiler 26 is hydraulically connected to the brewer reservoir and includes a check valve between the boiler 26 and the reservoir which prevents water from reentering the reservoir.

A reservoir empty level control 28 is electrically interconnected with the boiler 26 such that the boiler is disconnected when the level of water in the reservoir reaches a predetermined point. The reservoir empty level control 28 is also a metallic rod through which an electrical current is passed to a ground probe using water within the reservoir as a conductor to complete an electrical circuit for disconnecting the boiler 26 when a predetermined water level is reached. This level is normally just above the bottom of the reservoir or is, in some instances, a sump that is located in its bottom to provide a minimum amount of water to be left in the reservoir surrounding the metallic rod, or probe as it is sometimes designated.

A half pot selection is usually available on the commercial coffee brewer allowing the user to select only half of the output of coffee, it will be noted that many of the same components are utilized and it functions in the same basic manner with a few exceptions, therefore a detailed explanation is in order, even though it is repetitive in nature.

A half pot brew switch 30 is also a part of the coffee brewer consisting of a touch pad switch, or a push button switch mounted on the coffee brewer control panel and basically functions in the same manner as the full pot brew switch 20

The fill solenoid 22 is also electrically interconnected with the half pot brew switch 30 and when energized the fill solenoid 22 begins to fill the brewer reservoir with water only to a level that is half of the capacity of the reservoir. This fill solenoid 22 is an electromagnetic solenoid valve which is well known in the art and has been described in detail previously.

A half pot fill level control 32 is electrically interconnected with the half pot brew switch 30 such that when water in the reservoir reaches the predetermined level which is basically half full, the fill solenoid 22 is de-energized terminating water flow. In a automated coffee brewer, in which the invention may be utilized, the half pot fill level control 32 is a metallic rod through which an electrical current is passed to a ground probe using water within the reservoir as a conductor to complete an electrical circuit thus indicating that the predetermined water level water level has been achieved disconnecting the fill solenoid 22.

A boiler 26 is electrically interconnected with the half pot brew switch 30 such that when the half pot brew switch 30 is energized the boiler 26 is activated simultaneously with the fill solenoid 22 thereby boiling water for brewing coffee. The boiler 26 has been described previously and forces the boiling water and steam into a spray head which evenly distributes the liquid and vapor over coffee grounds retained in a filter.

A reservoir empty level control 28 is electrically interconnected with the boiler 26 such that the boiler is disconnected when the level of water in the reservoir reaches a predetermined point. The reservoir empty level control 28 and its function has been described in detail and operates for both the full and half brewing operations.

To recap the sequential function of the invention it may be described in terms of the following; means for starting the brew cycle in said automated coffee brewer consisting of the full or half pot brew switch 20 and 30. There are also means for filling the brewers reservoir with water to a predetermined level when activated by the starting means which is the fill solenoid 22. Fill level control means interconnect with the filling means for suspending filling water into the reservoir are comprised of the full and half pot fill level control 24 and 32. Further the boiler 26 is electrically energized by the means for starting supplying boiling water for brewing coffee, and a reservoir empty level control means in the form of the reservoir empty level control 28 is electrically interconnected with the boiler 26 such that the boiler is disconnected when the level of water in the reservoir reaches a predetermined point.

Figure 2:
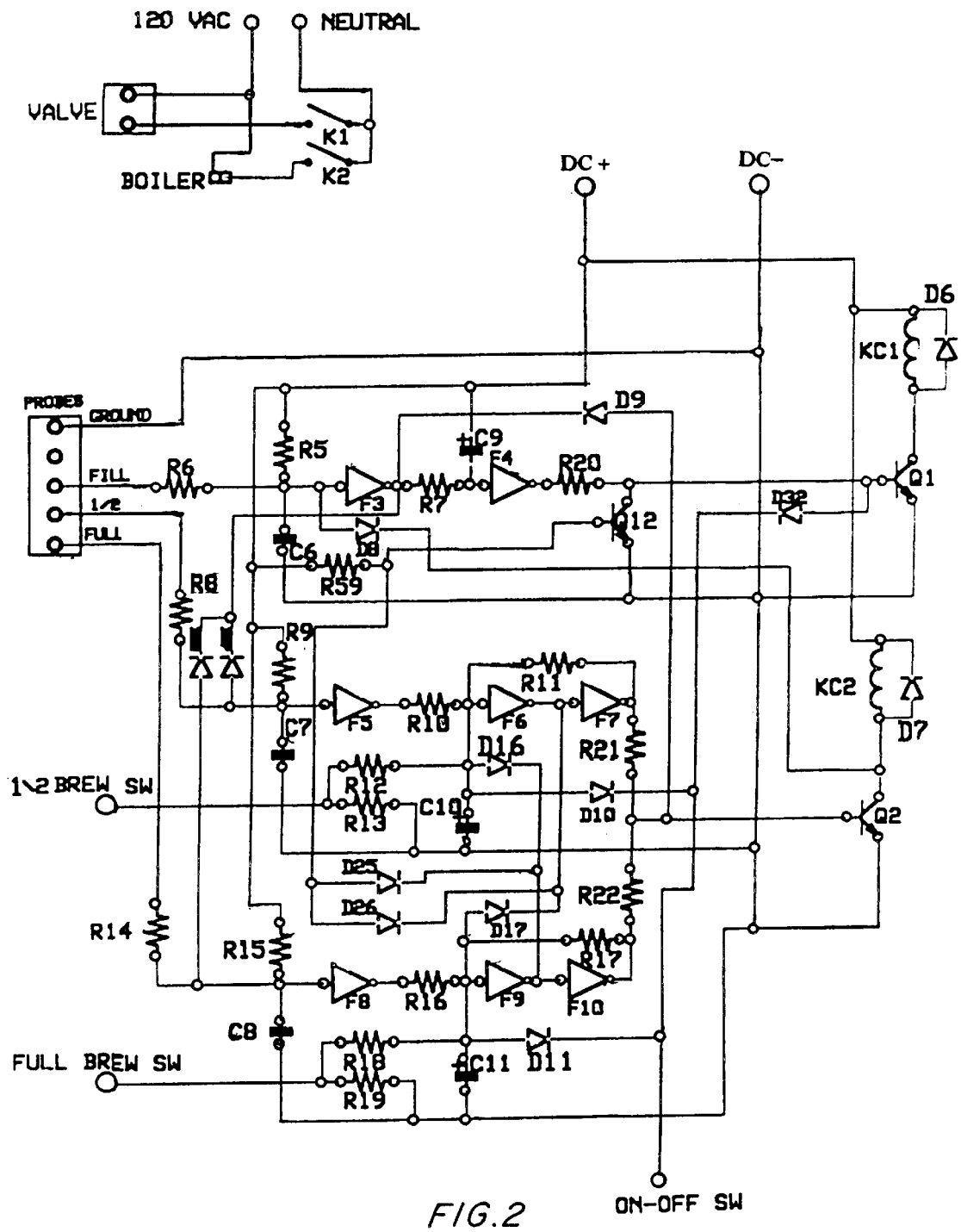
FIG. 2 is an electrical schematic diagram of the improvement in an existing coffee brewing system.

In order to illustrate one method of implementing the invention into an existing coffee brewer having solid state electronic controls the schematic of FIG. 2 depicts a coffee brewer similar to the inventors apparatus protected by U.S. Pat. No. 5,836,236 described in the background art. It should be noted however that a slight difference is in the practical embodiment, as illustrated in the schematic, and the preferred embodiment described above in that the feature of the water level in the half pot mode is filled to the full level and only boiled off the half level using the half pot fill level control 32 as the empty level control. In this arrangement the reservoir empty level control 28 still operates in the same manner except it only acts as a safety switch in the event of loss of water locked out the boiler 26 when in the half mode of operation. It is apparent that the basic function of the brewer as modified by the schematic is unchanged from that described and claimed however it required only a minor amount of change to add this feature to the existing in production equipment and is therefore included in this disclosure.

A detailed description of the schematic, as illustrated in FIG. 2, is as follows: The full pot brew switch 20 is designated FULL BREW SWITCH and consists of resistors R15 through R19 and R22, capacitors C8 and C11, diodes D11, D17, D25 and D26 also integrated circuits F8 through F10.

The fill solenoid 22 is operated by alternating current voltage and is designated VALVE with the relay contacts designated K1 and the relay holding coil KC1 along with a noise eliminating diode D6. Switching is accomplished using transistor Q1 and diode D32.

The full pot fill level control 24 is designated FULL and uses resistor R14 along with its metallic probe The boiler 26 is also operated by alternating current voltage and is designated BOILER with the relay contacts designated K2 and the relay holding coil KC2 along with a noise eliminating diode D7 while switching is accomplished using transistor Q2.

The reservoir empty level control 28 circuit is designated FILL and includes resistors R5 through R7, R20 and R59, capacitors C6 and C9, diodes D8 and D9 transistor Q12 and integrated circuits F3 and F4.

The half pot brew switch 30 is designated ½ BREW SWITCH and consists of resistors R8 through R13 and R21, capacitors C7 and C10, diodes D16 and D10 also integrated circuits F5 through F7.

In the half pot brewing function the boiler 26 and fill solenoid 22 function the same as above described.

While the invention has been described in complete detail and pictorially shown in the accompanying drawings, it is not to be limited to such details, since many changes and modifications may be made to the invention without departing from the spirit and scope thereof hence, it is described to cover any and all modifications and forms which may come within the language and scope of the appended claims.

What is claimed is:

1. A fill before brewing system for an automated coffee brewer having a water reservoir and an external water source comprising:

a) a full pot brew switch integral with said coffee brewer wherein said full pot brew switch further comprises a touch pad switch mounted on the coffee brewer control panel, a fill solenoid hydraulically connected to said water source and electrically interconnected with the full pot brew switch such that when the full pot brew switch is energized the fill solenoid begins to fill the brewer reservoir with water from the water source, a full pot fill level control electrically interconnected with the full pot brew switch such that when water in the reservoir reaches a predetermined level the fill solenoid is deenergized terminating water flow, a boiler hydraulically connected to the reservoir and electrically interconnected with the full pot brew switch such that when the full pot brew switch is energized the boiler is activated simultaneously with the fill solenoid thereby boiling water for brewing coffee, a reservoir empty level control electrically interconnected with the boiler such that the boiler is disconnected when the reservoir level of water reaches a predetermined point, b) a half pot brew switch integral with said coffee brewer wherein said half pot brew switch further comprises a touch pad switch mounted on the coffee brewer control panel, said fill solenoid electrically interconnected with the half pot brew switch such that when the half pot brew switch is energized said fill solenoid begins to fill the brewer reservoir with water, a half pot fill level control electrically interconnected with the half pot brew switch such that when water in the reservoir reaches a predetermined level the fill solenoid is deenergized terminating water flow, and said boiler also electrically interconnected with the half pot brew switch such that when the half pot brew switch is energized the boiler is activated simultaneously with the fill solenoid thereby boiling water for brewing coffee, with said reservoir empty level control disconnected the boiler when the reservoir level of water reaches a predetermined point.

2. The fill before brewing system for an automated coffee brewer as recited in claim 1 wherein said fill solenoid is an electromagnetic solenoid valve.

3. The fill before brewing system for an automated coffee brewer as recited in claim 1 wherein said full pot fill level control is a metallic rod through which an electrical current is passed to a ground probe using water within the reservoir as a conductor to complete an electrical circuit thus indicating said predetermined water level has been achieved disconnecting the fill solenoid.

4. The fill before brewing system for an automated coffee brewer as recited in claim 1 wherein said half pot fill level control is a metallic rod through which an electrical current is passed to a ground probe using water within the reservoir as a conductor to complete an electrical circuit thus indicating said predetermined water level to the fill solenoid.

5. The fill before brewing system for an automated coffee brewer as recited in claim 1 wherein said boiler is an electrical resistance element housed in a watertight cylinder.

6. The fill before brewing system for an automated coffee brewer as recited in claim 1 wherein said reservoir empty level control is a metallic rod through which an electrical current is passed to a ground probe using water within the reservoir as a conductor to complete an electrical circuit thus disconnecting the boiler when a predetermined water level is reached.

* * * * *